Jan. 24, 1950  J. M. BLAIR ET AL  2,495,650
COINCIDENCE PROPORTIONAL COUNTER
Filed July 5, 1945  2 Sheets-Sheet 1

Witnesses:
Herbert E. Metcalf
William J. Ruano

Inventors:
John Morris Blair
James M. Hush
By:
Attorney

Jan. 24, 1950 J. M. BLAIR ET AL 2,495,650
COINCIDENCE PROPORTIONAL COUNTER
Filed July 5, 1945 2 Sheets-Sheet 2

Patented Jan. 24, 1950

2,495,650

UNITED STATES PATENT OFFICE 2,495,650

COINCIDENCE PROPORTIONAL COUNTER

John Morris Blair, Stillwater, Okla., and James M. Hush, Lincoln, Nebr., assignors to the United States of America as represented by the United States Atomic Energy Commission Application July 5, 1945, Serial No. 603,397

16 Claims. (Cl. 250—83.6)

The present invention relates to apparatus for detecting neutrons, such as fast neutrons. More specifically, it relates to a coincidence proportional counter that is useful for measuring the absolute flux of neutrons, particularly fast neutrons.

Proportional counters have been used in the past especially for the detection of heavy particles, such as alpha particles, protons and deuterons because of the property of proportional counters to distinguish these heavy particles from lighter particles, such as electrons, since the pulse produced or charge collected by the center-wire of such counters is proportional to the original ionization by the particles. Argon has been one of the preferred gases used as the ionizing medium in such counters since it has certain desirable properties such as a low threshold potential. An outstanding disadvantage arising from the use of argon is the creation of a high background due largely to argon recoil nuclei resulting from neutron bombardment. Such argon background has been so high in many cases as to make the counter useless for distinguishing proton recoil nuclei from a hydrogenous film, such as paraffin used as a proton radiator, from argon recoil nuclei due to neutron irradiation of the gas, hence making the counter useless for detecting neutrons.

An object of the present invention is to provide a novel proportional counter which is devoid of the above named disadvantage, more specifically, to provide an argon-filled coincidence proportional counter of such construction as to eliminate the high background effects due to argon recoil nuclei, thereby making it possible to accurately detect proton recoils from a hydrogenous film radiator in the sensitive portion of the counter tube chamber even in the presence of a high background of argon recoil nuclei.

A further object of the present invention is to provide a novel sensitive coincidence proportional counter that is adapted to measure the absolute flux of neutrons, particularly of fast neutrons.

A more specific object of the present invention is to provide a novel coincidence proportional counter for the detection and range measurement of recoil protons from a hydrogenous film irradiated by neutrons.

Other objects and advantages will become apparent from the study of the following specification taken with the accompanying drawings wherein.

Figure 1:
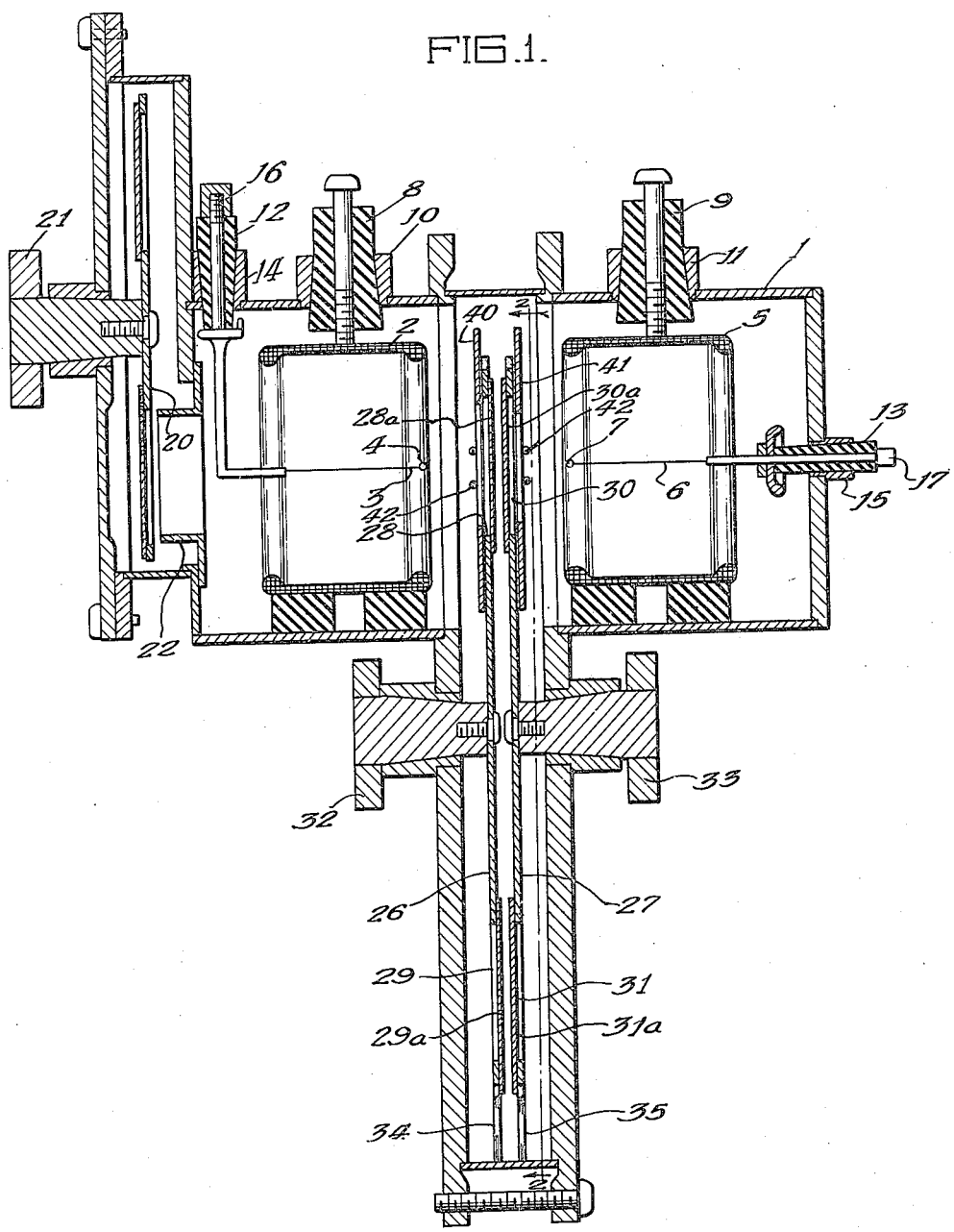
Fig. 1 is a vertical cross-sectional view along the longitudinal center line of a proportional counter tube embodying the teachings of the present invention and adapted to be used in a coincidence circuit.
Figure 2:
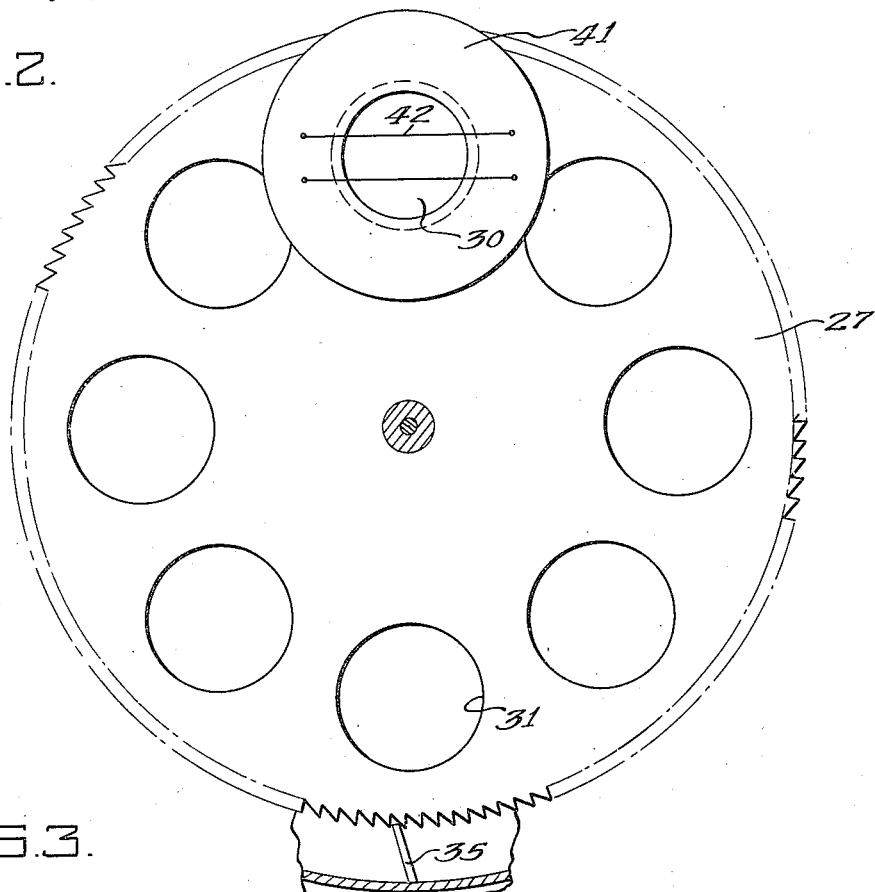
Fig. 2 is a cross-sectional view, partly in elevation, taken along line 2—2 of Fig. 1.

Referring more particularly to the drawings, numeral 1 denotes a gas-tight metallic casing of brass, for example, enclosing a pair of proportional counter units or chambers, one including a hollow cylindrical high voltage electrode 2 and an axially disposed center-wire electrode 3 terminating in a small sphere 4 and the other including a similar hollow cylindrical high voltage electrode 5, and an axially disposed center-wire electrode 6 terminating in a small sphere 7. The center-wire electrodes may be made, for example, of 10 mil nickel with 1.5 mm. diameter aluminum spheres 4 and 7 at the ends. The high voltage electrodes 2 and 5 are insulatingly supported in casing 1 by means of insulators 8 and 9, respectively, of hard rubber, for example, having tapered surfaces tightly fitted and sealed with "glyptal" or other suitable sealing material to correspondingly tapered metal collars 10 and 11, respectively, extending from casing 1. Likewise, tapered insulators 12 and 13, sealed in a similar manner to collars 14 and 15, are provided for insulatingly supporting lead-ins 16 and 17 of center wire electrodes 3 and 6, respectively. Lead-ins 16 and 17 are each connected to input grids of two separate amplifiers (not shown) which amplifiers are connected in a coincidence circuit so that only pulses originating from ionization in both counter tube chambers simultaneously will be counted. A suitable coincidence circuit for interconnecting the amplifier outputs is the well-known Rossi coincidence circuit using negative pulses and having an adjustable grid bias so that pulses smaller than a selected amount will not produce a coincidence pulse, which circuit is described in detail in the article by B. Rossi, in the publication "Nature," 125, 636 (1930) and which circuit, per se, forms no part of the present invention.

Because of the initial amplification of the pulses of the recoil protons which occurs in the present proportional counter under proper pressure and voltage conditions, it is not necessary to have an amplifier that will deal with pulses as small as those obtained when using an ordinary ionization chamber. Therefore, it has been found satisfactory to use amplifiers consisting of about four stages each.

At one end of casing 1, there is provided a wheel 20 having a plurality of circularly disposed radiators comprising different thicknesses of film made of a hydrogenous material, such as paraffin from which material recoil protons are ejected when irradiated with neutrons, such as fast neutrons. For example, there may be, on wheel 20, three circular radiators of paraffin evaporated on platinum discs, one blank platinum disc, and a disc of polonium. The polonium is used as a source of alpha particles for preliminary testing of the gas amplification effect in the counter prior to the taking of data.

Wheel 20 is rotatably supported on casing 1 and is secured to an external handle 21 through a tapered ground joint forming a gas-tight seal. In normal operation, wheel 20 is rotated by handle 21 to any one of a number of positions depending on the thickness of paraffin film desired in the active portion of the counter chamber. A collimating ring 22 is rigidly supported by casing 1 and defines a circular portion of one of the paraffin film segments on wheel 20 for exposure to the active portion of the counter units.

Wheels 26 and 27 of brass, for example, are rotatably mounted on a centrally located, depending portion of casing 1 and are journaled in tapered ground joints forming gas-tight sliding seals with the casing 1. Wheel 26 has a plurality of circular apertures such as 28 and 29 disposed along the periphery thereof and covered with proton absorbing foils such as aluminum foils 28a and 29a of different thicknesses, therefore having different absorption characteristics for proton recoils. To allow a fair latitude of selectivity, wheel 26 may have, for example, ten holes of which eight may be covered with aluminum absorbers of different thicknesses, one with copper or platinum plate, and one hole being uncovered. Wheel 27 similarly has a plurality of peripherally disposed circular apertures such as 30 and 31, most of which are covered with collodion foils 30a and 31a for example, of different thicknesses. Wheel 27 may have ten holes of which seven may be covered with collodion absorbers of different thickness, two covered with aluminum foils of different thickness, and the remaining hole uncovered.

Aluminum foil is chosen for wheel 26 since it is a good absorber for recoil protons ejected from the paraffin film on wheel 20 although it should be understood that any other material that has high absorption for protons may be used instead. Since it is extremely difficult to make aluminum foil sufficiently thin for certain radiation measuring conditions and to avoid too widely separate thicknesses of the various aluminum foils and since it is desirable to provide for gradual interpolation or finer graduations of absorber thickness the second wheel 27 is provided with different thicknesses of collodion or other material having a lower absorption for recoil protons than aluminum. It would require about a 76 per cent heavier layer of collodion than of aluminum for a given proton stopping power. It should be understood, however, that wheel 27 may be eliminated if such wide selection of absorber thickness is not desired.

Wheels 26 and 27 may be rotated independently by external handles 32 and 33, respectively, so as to provide various combinations of thicknesses of the aluminum and collodion film absorbers.

Wheels 26 and 27 are held in any of a number of fixed positions, corresponding to the number of absorbers on each wheel, by means of stationary pawls or springs 34 and 35 which cooperate with notches disposed on the periphery of the respective wheels for accurately determining the various fixed positions of the wheels. Shields 40 and 41 are fixed to casing 1 and have circular apertures approximately in registry with apertures such as 28 and 30 of wheels 26 and 27, respectively. Shields 40 and 41 together with collimating ring 22 effectively collimate the stream of recoil protons ejected from the paraffin film radiator on wheel 20 and provide a definite solid angle, for example, one of the order of about 0.066 steradian, subtended by the shield apertures as seen from the radiator. Any proton starting from the paraffin radiator and passing through ring 22 and apertures 28 and 31 will not hit the counter wall until it has passed completely through the second or furthermost counter chamber; therefore, the various pulse heights will not vary too widely. Furthermore, an accurate determination of the number of recoil protons produced from the radiator necessitates an accurate knowledge of the effective solid angle of the counter.

In order to provide a more uniform field distribution at the collimator holes of shields 40 and 41 and prevent too great a change in electric field distribution about the center-wire electrodes when changing from aluminum to collodion absorbers, or vice versa, a plurality of shield wires 42 are provided across the collimator holes.

The provision of aluminum and collodion films as proton absorbers reduces the number of background counts due to argon recoil nuclei practically to zero because the recoil argon atoms cannot penetrate an aluminum absorber, and thereby give ionization in both counter chambers simultaneously, and even if the aluminum absorber were not there the recoil track would be so short as to practically eliminate the possibility of ions being produced in both chambers simultaneously by a single argon recoil atom.

Background counts due to reactions from wall surface contamination may be reduced by plating all parts "visible to" the center-wire electrodes with copper from an electrolytic solution of $CuSO_4$, for example, and by being careful not to touch the freshly plated surfaces when assembling the counter. Such copper plating apparently also cuts down background counts due to possible $n, p,$ and $n, \alpha,$ reactions, that is, reactions whereby irradiation by neutrons produces protons or alpha particles from the counter walls. It is desirable to construct the counter so that no insulator gasket or stop cock grease, which are inherently hydrogenous, are "visible" from the active portion of the chambers in order to prevent the occurrence of recoil protons therefrom.

Tests with a small alpha-particle gun that is adapted to project a well collimated beam of alpha-particles in any region of the counter chamber show that pulses due to alpha particles travelling in different regions of the counter are near enough the same size so that the scaler bias can be easily set to count the smallest of them without counting pulses due to gamma rays or electrons.

As the gain of the amplifier is varied, while holding other factors constant, there is found a wide plateau over which the same number of pulses is counted irrespective of the portions of the counter chamber through which the particles are projected. Thus, if the counter is operated within such a plateau, all of the protons passing through it will be counted.

The casing 1 is filled with an ionizable gas such as, for example, argon at pressures of the order of 1 cm. to 10 cm. of Hg, the lower pressure being limited by insufficient pulse size for counting. The potential applied to the high voltage electrodes has to be high enough to provide sufficient gas amplification to bring the desired pulses above the general background. An upper limit of this voltage is reached when the voltage is so high as to cause sparks inside the counter. It is important that a well stabilized source of potential be used since the amount of gas amplification varies quite rapidly with voltage.

The optimum pressure of argon to be used is dependent upon the particular energy of the neutrons being studied. For neutron energies of the order of a few hundred kilovolts, it is necessary to use a relatively low pressure in order to allow the recoil protons to pass completely through both chambers. As the neutron energy is increased, it is desirable to increase the argon pressure because more gas amplification can thus be obtained before spark over. Also, for higher energy neutrons, it is necessary to raise the gas pressure in order to keep the pulses from the recoil protons larger than those from recoil argon nuclei. As the neutron energy is increased, the pulses from the protons are decreased somewhat in size because of their lower ionizing power due to their increased velocity. On the other hand, the argon recoils generally have an energy of about one-tenth of that of the incident neutrons, and because of their short range, they usually lose all of their energy within the active region of the counter chambers. Therefore, their pulses increase in size with an increase in neutron energy.

After the counter is filled to the proper gas pressure, the potential applied to the high voltage electrode is adjusted until the pulses from the alpha particle source within the chamber is ten or fifteen times as high as the background. The geometries of the two chambers are similar enough to make it possible to use the same voltage in both chambers.

The operation of the device is as follows: When the paraffin film on wheel 20 is irradiated by neutrons, particularly fast neutrons, from any suitable source (not shown) or, more specifically, when a particular sector of paraffin film confronting ring 22 is so irradiated, it will eject recoil protons from the film which recoil protons will enter the sensitive portion of the counter chamber illustrated at the left. By proper selection of absorber thicknesses, that is, by selecting the proper combination of aluminum foil and collodion foil on wheels 26 and 27, most of these recoil protons will penetrate the aluminum and collodion foils, and will enter the counter chamber illustrated on the right so as to give rise to ion pulses which occur simultaneously in both counter chambers, thereby giving rise to a coincidence pulse in the output. The extent to which recoil protons are transmitted by the absorbing foils is indicative of the energy of incident neutrons.

The incident neutrons will also cause recoil argon nuclei which are of much smaller range and which possess appreciably smaller energy than the recoil protons from the paraffin film. Hence, such recoil argon nuclei will be completely absorbed by the aligned aluminum foil on wheel 26, hence will not enter the chamber illustrated on the right, and will, therefore, not give rise to a coincidence count. Even with very thin or no absorbers at all on wheels 26 and 27, the range of the recoil argon nuclei being so small, it is very unlikely that many such recoil nuclei will enter the counter chamber illustrated on the right.

By suitable calibration of absorber thicknesses on wheels 26 and 27, it is possible to detect the range of recoil protons which is indicative of the energy of the incident neutrons on the paraffin film. The above described coincidence proportional counter is, therefore, effective to measure absolute neutron flux, and is particularly suitable for measuring the absolute flux of fast neutrons.

The thin absorber foils of collodion placed on wheel 27 may be made, for example, on glass or on water. If made on glass, it is necessary to have the plate glass well leveled. A metal ring may be placed on the glass to prevent the solution from spreading over too great an area. Alcohol and ether may be added to the commercial collodion solution to thin. The film can be removed by dipping the coated glass into water and allowing the water to soak in between the collodion and the plate. Such a method is satisfactory for thicker films.

Thinner films are preferably formed on water. In this case it is necessary that at least a large part of the solvent for the collodion be insoluble in water. Methyl acetate is not very soluble in water, and amyl acetate is even less soluble although the latter is rather viscous. In some cases these may be added to the water, too, in order to saturate it. A suitable solution may comprise one part collodion solution, one part amyl acetate and two parts methyl acetate for thicker films. By this method it is necessary that the solution dry very slowly as in a covered dish. The films may be picked up by a wire ring and dried. Films may be examined for uniformity in a sodium light, for example.

The desired thickness of these foils may be calculated from the stopping power of oxygen, carbon, hydrogen and nitrogen. It is estimated in this way that about 1.15 mg. per square centimeter is the thickness of collodion equivalent in stopping power to 1 cm. of standard air, or that it would require a 76 per cent heavier layer of collodion than of aluminum for a given stopping power.

The paraffin film radiators placed on wheel 20 may be produced by evaporation from melted paraffin onto thin metal disks in a good vacuum. Unless a suitable vacuum is used, the paraffin deposits as little drops on the metal. By use of a suitable vacuum such as may be obtained by a diffusion pump and liquid air trap, a continuous paraffin film may be obtained. If copper disks are used and are carefully cleaned before the paraffin is evaporated on them, they may become discolored. In order to eliminate this difficulty, it is preferable to use platinum disks instead of copper disks.

To aid in the control of the thickness of the film formed, a special heater may be inserted inside a bell jar, and by the use of a magnetically operated shutter, the time of beginning and of ending of the deposition of the paraffin may be accurately determined. A thermocouple may be used for measuring the paraffin temperature.

During the entire time of evaporation of paraffin, which is usually of the order of about 20 minutes, the temperature is preferably kept constant to within a few tenths of a degree. The thickness of the film is obtained by weighing the metal disk on a microbalance before and after evaporation.

Since the pulses due to the recoil protons are not as large as those due to alpha particles, it is not possible to make the final adjustments of amplifier gain and coincidence bias with the alpha particles. After adjusting the voltage, the gains of the amplifiers are varied until the proton pulses from them are the same as seen in an oscilloscope. The coincidence counts are then recorded for a given amount of bombardment of the target for several different settings of the coincidence circuit bias. When the bias is high, no pulses are large enough to cause coincidence counts. Then, as the bias is lowered, more and more coincidence counts are produced. Under proper conditions, there is a region over which the bias can be varied without changing the number of counts recorded. For smaller bias, the number of the counts increases rapidly due to the acceptance by the coincidence circuit of the background noise.

Figure 3:
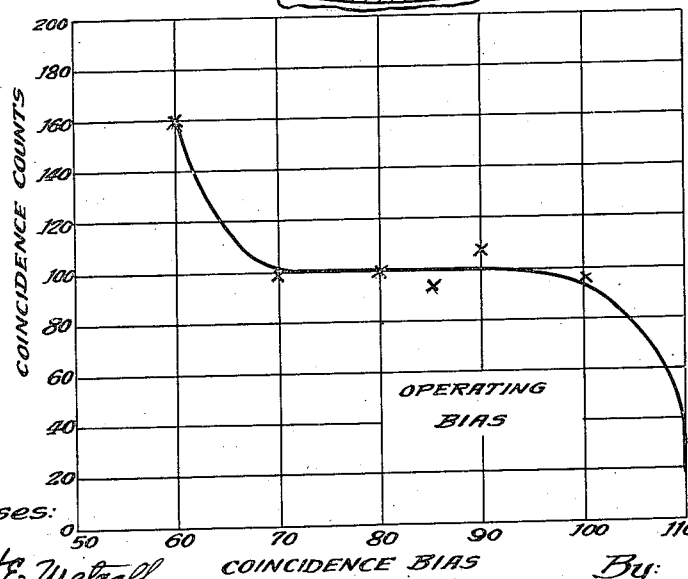
Fig. 3 is a graph of coincidence counts versus coincidence circuit bias obtained by operating the proportional counter tube illustrated in Figs. 1 and 2 in a coincidence circuit.

Fig. 3 shows a typical curve of variation in coincidence counts with variations in coincidence bias. For certain types of coincidence circuits, it is more convenient to keep the bias on the coincidence circuit constant while varying the gains of the two amplifiers together inasmuch as this accomplishes the same purpose.

The fact that the curve shown in Fig. 3 always shows a marked plateau indicates that the pulses produced in the chambers by recoil protons are all of nearly the same height for if there were a continuous distribution in pulse size, no such plateau would be evident. The bias is set so that the circuit will operate in the center of the plateau in order that small, accidental variations will not show up in the data.

When taking data with the coincidence proportional counter, it is found advisable to take runs alternately with and without the paraffin radiator in place. For the background runs, a clean platinum disk is put in place of the radiator. With this disk in place the counts which occur are due to hydrogen contamination in the counter, accidental coincidences, and pick up from occasional external disturbances. The difference between the number of counts with the radiator in place and without it is due to the recoil protons from the paraffin. The background counts are usually one-tenth to one-sixth of the total number of counts with the radiator in place.

Ordinarily, in addition to taking counts without any absorber between the chambers, runs may be taken with various absorbing foils between the chambers. Under proper operating conditions, the difference between the number of counts with the radiator and the number without the radiator remains constant until the absorber thickness becomes great enough to completely stop the protons.

It will be seen, therefore, that by the present invention a very efficient, sensitive, and accurate proportional counter is provided which is capable of measuring the absolute flux of fast neutrons irrespective of high backgrounds due to argon recoil nuclei.

Modifications will become apparent to those skilled in the art after having had the benefit of the teachings of the present specification for which reason the present invention should not be restricted except insofar as set forth in the following claims.

What is claimed is:

1. Apparatus of the kind described comprising a gas-filled chamber, hydrogenous material in said chamber from which to produce recoil protons, and two aligned counter ionization units spaced from and in line with said hydrogenous material, said units being connected into a coincidence circuit so that only pulses originating from ionization in both units at the same time are counted.

2. Apparatus of the kind described comprising a chamber, an inert gas in said chamber, hydrogenous material in said chamber from which to produce recoil protons, two aligned counter, ionization units spaced from and in line with said hydrogenous material through which such recoil protons are adapted to pass, said units being connected into a coincidence circuit so that only pulses originating from ionization in both units at the same time are counted, and means disposed between said units for absorbing recoil protons of predetermined energy.

3. Apparatus of the kind described comprising a gas-filled chamber, hydrogenous material in said chamber from which to produce recoil protons, aligned counter units spaced from and in line with said first hydrogenous material through which such recoil protons are adapted to pass, said units being connected into a coincidence circuit so that only pulses originating from ionization in said units at the same time are counted, means disposed between said units for absorbing recoil protons of predetermined energy, and means for changing said last means to absorb recoil protons of different predetermined energies, whereby recoil protons of greater energies at each such setting are counted.

4. A proportional counter for use in a coincidence circuit comprising a gas-filled chamber, two pairs of electrodes disposed in said chamber, each pair forming a proportional counter unit, hydrogenous material at one end of said chamber for producing recoil protons as the result of irradiation by neutrons, and means interposed between said counter units for absorbing low energy recoil protons.

5. Apparatus for measuring absolute neutron flux, comprising, in combination, a gas-filled chamber including a pair of coaxially disposed and longitudinally spaced proportional counter units interconnected to form a coincidence circuit so that only pulses originating from ionization in both units at the same time will be counted, an hydrogenous film at the sensitive end of one of said units for producing recoil protons as the result of irradiation by neutrons entering along the axes of said counter units, and means interposed between said counter units for absorbing a portion of said recoil protons.

6. Apparatus for measuring absolute neutron flux, comprising, in combination, a gas-containing, gas-tight chamber, a pair of proportional counter units in said chamber, each having an anode and cathode coaxially disposed and longitudinally spaced with respect to the anode and cathode of the other unit, respectively, said counter units being interconnected to form a coincidence circuit so that only pulses originating from ionization in said counter units simultaneously will be counted, a hydrogenous film disposed across one end of said counter units for producing recoil protons as the result of irradiation by neutrons entering along the axes of said counter units, and means disposed centrally of said chamber for selectively interposing recoil proton absorbing screens of different thicknesses between said counter units which screens prevent transmission of recoil nuclei from the gas in said chamber.

7. Apparatus for measuring absolute neutron flux, comprising in combination, an argon-containing, gas-tight chamber, a pair of proportional counter units in said chamber, each having an anode and cathode coaxially disposed and longitudinally spaced with respect to the anode and cathode of the other unit, respectively, said counter units being interconnected to form a coincidence circuit so that only pulses originating from ionization in said counter units simultaneously will be counted, a paraffin film disposed across the end of one of said counter units for producing recoil protons as the result of irradiation by neutrons entering along the axes of said counter units, and a wheel having a plurality of aluminum screens disposed peripherally thereof and having different thickness, hence different recoil proton absorbing characteristics, said wheel being disposed in said chamber in a manner so that said screens may be selectively interposed between said counter units.

8. Apparatus for the detection and range measurement of recoil protons comprising a coincidence proportional counter including a gas-filled chamber, two coaxially and longitudinally disposed proportional counter units in said chamber each including a center-wire electrode surrounded by a hollow cylindrical electrode, a hydrogenous material disposed across the end of one of said units adjacent the chamber wall and adapted to emit recoil protons when irradiated by neutrons from a radioactive sample, and a wheel rotatably mounted in said chamber and having peripherally disposed openings covered by proton absorbing screens of different thickness for selective screening of low energy proton recoils such as recoil nuclei of the gas due to irradiation by said neutrons.

9. A proportional counter for use in a coincidence circuit comprising a gas-filled chamber, two pairs of electrodes disposed in said chamber, each pair forming a proportional counter unit, means at one end of said chamber for producing recoil protons as the result of irradiation by neutrons, and means interposed between said counter units for absorbing low energy recoil protons comprising a pair of wheels coaxially mounted and rotatably adjustable in said chamber, each including a plurality of peripherally disposed holes covered with different thicknesses of proton absorbing material, the absorbing material on one of said wheels having a substantially different proton absorption characteristic than that on the other.

10. Apparatus for the detection and range measurement of recoil protons comprising a coincidence proportional counter including a gas-filled chamber, two coaxially and longitudinally disposed proportional counter units in said chamber each including a center-wire electrode surrounded by a hollow cylindrical electrode, a hydrogenous material disposed across the end of one of said units adjacent the chamber wall and adapted to emit recoil protons when irradiated by neutrons from a radioactive sample, shield means interposed between said units including a hole in alignment with said center-wire electrodes, and means for selectively interposing proton absorbing screens of different thickness in alignment with said hole.

11. Apparatus for the detection and range measurement of recoil protons comprising a coincidence proportional counter including a gas-filled chamber, two coaxially and longitudinally disposed proportional counter units in said chamber each including a center-wire electrode surrounded by a hollow cylindrical electrode, a hydrogenous material disposed across the end of one of said units adjacent the chamber wall and adapted to emit recoil protons when irradiated by neutrons from a radioactive sample, shield means interposed between said units including a hole in alignment with said center-wire electrodes, and collimating means confronting said hydrogenous material and cooperating with said hole to limit the solid angle of recoil protons entering the region of the counter unit farthest from said hydrogenous material.

12. Apparatus for the detection and range measurement of recoil protons comprising a coincidence proportional counter including a gas-filled chamber, two coaxially and longitudinally disposed proportional counter units in said chamber each including a center-wire electrode surrounded by a hollow cylindrical electrode, a hydrogenous material disposed across the end of one of said units adjacent the chamber wall and adapted to emit recoil protons when irradiated by neutrons from a radioactive sample, shield means interposed between said units including a hole in alignment with said center-wire electrodes, and collimating means confronting said hydrogenous material and cooperating with said hole to limit the solid angle of recoil protons entering the region of the counter unit farthest from said hydrogenous material, said shield means including means for selectively interposing proton absorbing screens of different proton absorption characteristics in alignment with said hole.

13. Apparatus for the detection and range measurement of recoil protons comprising a coincidence proportional counter including a gas-filled chamber, two coaxially and longitudinally disposed proportional counter units in said chamber each including a center-wire electrode surrounded by a hollow cylindrical electrode, a hydrogenous material disposed across the end of one of said units adjacent the chamber wall and adapted to emit recoil protons when irradiated by neutrons from a radioactive sample, shield means interposed between said units including a hole in alignment with said center wire electrodes, means for selectively interposing proton absorbing screens of different thickness in alignment with said hole, and shield wires extending across and in confronting relationship with said holes for maintaining substantially constant electric field distribution adjacent said center-wire electrodes.

14. Apparatus for the detection and range measurement of recoil protons comprising a coincidence proportional counter including a gas filled chamber, two coaxially and longitudinally disposed proportional counter units in said chamber each including a center-wire electrode surrounded by a hollow cylindrical electrode, a hydrogenous material disposed across the end of one of said units adjacent the chamber wall and adapted to emit recoil protons when irradiated by neutrons from a radioactive sample, shield means interposed between said units including a hole in alignment with said center-wire electrodes, and means for selectively interposing proton absorbing screens of different thickness in alignment with said hole, said last named means comprising a pair of coaxially mounted wheels having peripherally disposed holes covered with different thicknesses of proton absorbing material for alignment with said hole in said shield means.

15. Apparatus for the detection and range measurement of recoil protons comprising a coincidence proportional counter including a gas filled chamber, two coaxially and longitudinally disposed proportional counter units in said chamber each including a center-wire electrode surrounded by a hollow cylindrical electrode, a hydrogenous material disposed across the end of one of said units adjacent the chamber wall and adapted to emit recoil protons when irradiated by neutrons from a radioactive sample, shield means interposed between said units including a hole in alignment with said center-wire electrodes, and means for selectively interposing proton absorbing screens of different thickness in alignment with said hole, said last named means comprising a pair of coaxially mounted wheels having peripherally disposed holes covered with different thicknesses of proton absorbing material for alignment with said hole in said shield means, and shield wires extending across said hole for maintaining relatively constant field distribution adjacent said center wire electrodes irrespective of selective changes in thickness of said proton absorbing material.

16. Apparatus for measuring absolute neutron flux, comprising, in combination, an argon-containing, gas-tight chamber a pair of proportional counter units in said chamber, each having an anode and cathode coaxially disposed and longitudinally spaced with respect to the anode and cathode of the other unit, respectively, said counter units being inter-connected to form a coincidence circuit so that only pulses originating from ionization in said counter units simultaneously will be counted, radiator means disposed adjacent one of said units in proximity to the wall of the chamber for producing recoil protons when irradiated with fast neutrons, a shield interposed between said units having a hole in alignment with the active portions of said units, said hole being covered with a material that absorbs argon recoil nuclei resulting from irradiation of the argon with fast neutrons.

JOHN MORRIS BLAIR.
JAMES M. HUSH.

REFERENCES CITED

The following references are of record in the file of this patent:

UNITED STATES PATENTS

| Number | Name | Date |
| --- | --- | --- |
| 2,349,753 | Pontecorvo | May 23, 1944 |